(12) United States Patent
Docter

(10) Patent No.: US 9,720,169 B2
(45) Date of Patent: Aug. 1, 2017

(54) INTEGRATED PHOTONIC COMPONENT AND METHOD

(71) Applicant: EFFECT PHOTONICS, Eindhoven (NL)

(72) Inventor: Boudewijn Docter, Eindhoven (NL)

(73) Assignee: EFFECT PHOTONICS B.V., Eindhoven (NL)

( * ) Notice: Subject to any disclaimer, the term of this patent is extended or adjusted under 35 U.S.C. 154(b) by 0 days.

(21) Appl. No.: 14/778,776

(22) PCT Filed: Mar. 20, 2014

(86) PCT No.: PCT/NL2014/050171
§ 371 (c)(1),
(2) Date: Sep. 21, 2015

(87) PCT Pub. No.: WO2014/148902
PCT Pub. Date: Sep. 25, 2014

(65) Prior Publication Data
US 2016/0047985 A1 Feb. 18, 2016

(30) Foreign Application Priority Data

Mar. 20, 2013 (EP) ..................................... 13160178

(51) Int. Cl.
*G02B 6/26* (2006.01)
*H04J 14/06* (2006.01)
(Continued)

(52) U.S. Cl.
CPC ...... *G02B 6/12033* (2013.01); *G02B 6/12004* (2013.01); *G02B 6/12011* (2013.01);
(Continued)

(58) Field of Classification Search
None
See application file for complete search history.

(56) References Cited

U.S. PATENT DOCUMENTS 6,215,566 B1 * 4/2001 Miyazaki ................ H01S 3/067
398/9
6,526,203 B1 * 2/2003 Gonzalez ........... G02B 6/12016
385/24
(Continued)

FOREIGN PATENT DOCUMENTS

WO 03/032547 A2 4/2003

OTHER PUBLICATIONS

International Search Report, dated Jun. 23, 2014, from corresponding PCT application.

Primary Examiner — Oommen Jacob
(74) Attorney, Agent, or Firm — Young & Thompson

(57) ABSTRACT

An integrated photonic component (1) is provided with improved centering of an optical field image of a wavelength division multiplexing, WDM, optical output signal and a common output waveguide (8). In this way an efficient power coupling of the laser diodes of the integrated photonic component to the common output waveguide is achievable. Also provided is a photonic integrated circuit, PIC, for use in a WDM optical communication system, the PIC including the integrated photonic component. A method of improving centering of an optical field image of a WDM signal and a common output waveguide of at least one of the integrated photonic component and the PIC are also described.

15 Claims, 8 Drawing Sheets

(51) Int. Cl.
*G02B 6/12* (2006.01)
*G02B 6/293* (2006.01)
*G02B 6/42* (2006.01)
*H04J 14/02* (2006.01)

(52) U.S. Cl.
CPC ....... *G02B 6/12019* (2013.01); *G02B 6/2938* (2013.01); *G02B 6/4286* (2013.01); *H04J 14/02* (2013.01)

(56) References Cited

U.S. PATENT DOCUMENTS

| | | | |
|---|---|---|---|
| 2002/0168146 A1 | 11/2002 | Watanabe | |
| 2004/0131313 A1* | 7/2004 | Van Weerden | G02B 6/12016 385/37 |
| 2004/0190565 A1* | 9/2004 | Thourhout | H01S 5/4062 372/20 |
| 2004/0264857 A1* | 12/2004 | Bernasconi | G02B 6/12016 385/37 |
| 2005/0089273 A1* | 4/2005 | Squires | G02B 6/12019 385/37 |
| 2005/0157984 A1* | 7/2005 | Han | G02B 6/12014 385/47 |
| 2005/0213887 A1* | 9/2005 | Balakrishnan | G02B 6/4246 385/46 |
| 2008/0019640 A1* | 1/2008 | Blum | G02B 6/12011 385/37 |
| 2013/0121695 A1* | 5/2013 | Bernasconi | H04J 14/0204 398/49 |
| 2016/0047985 A1* | 2/2016 | Docter | G02B 6/12004 398/79 |

\* cited by examiner

Detuning

INTEGRATED PHOTONIC COMPONENT AND METHOD

FIELD OF THE INVENTION

The present invention relates to an integrated photonic component with improved centering of an optical field image of a wavelength division multiplexing, WDM, optical output signal and a common output waveguide for improving efficient coupling of power of at least a first and a second laser diode of the integrated photonic component to the common output waveguide of that component. The invention further relates to a photonic integrated circuit, PIC, for use in a WDM optical communication system, the PIC comprising the component according to the invention. The invention further relates to a method of improving centering of an optical field image of a WDM signal and a common output waveguide of at least one of the integrated photonic component and the PIC according to the invention.

BACKGROUND OF THE INVENTION

Multi-wavelength lasers are key building blocks for communication networks that use multiple wavelengths on a single optical fiber. Integrating the transmitters, e.g. laser diodes, and the wavelength multiplexer on a single chip allows cost saving and leads to smaller components. FIG. 1 schematically shows a known integrated multi-wavelength laser 1 comprising an array of Distributed Bragg Reflector (DBR) lasers 2 and an integrated arrayed waveguide grating (AWG) or Phased Array (PHASAR) 3. Each of the lasers of the array of lasers 2 emits an optical input signal at a different wavelength and each of these lasers is in optical communication with one input waveguide of a plurality of input waveguides 7 of the AWG 3. The individual optical input signals of the lasers of the array of lasers are multiplexed into a wavelength division multiplexing (WDM) optical output signal comprising the sum of the individual input wavelengths ($\Sigma\lambda$). The WDM optical output signal is received by a common output waveguide 8.

The most efficient multiplexers are based on an Arrayed Waveguide Grating (AWG) 3 which is extensively described in a prior art document by M. K. Smit and C. van Dam, "PHASAR-Based WDM-Devices: Principles, Design and Applications", IEEE J. of Sel. Top. In Quant. Electr., Vol. 2, No. 2, June 1996, or an Echelle grating. Other methods of coupling multiple lasers into a single output usually have higher losses, especially for large numbers of lasers.

FIG. 2 schematically shows a basic layout of a known AWG 3. FIG. 2 shows that the AWG 3 has an input slab region or input free propagation range (FPR) 4 and an output slab region or output FPR 5 that are in optical communication by an array of waveguides 6 having a length increment from one waveguide to the next. Furthermore, the blow up in FIG. 2 schematically shows the arrangement of the waveguides of the array of waveguides 6 at the output section of the input FPR 4 of the AWG 3.

Furthermore, it can be seen from FIG. 2 that the input slab region 4 of the AWG 3 is also in optical communication with a plurality of input waveguides 7, whereas the output slab region 5 is also in optical communication with a central output waveguide 8 for receiving a WDM optical output signal. The AWG 3 further has a central channel wavelength, $\lambda_0$, and a number of channels that are spaced apart by a channel spacing, $\Delta\lambda$.

In order to have efficient power coupling of the optical input signals from the individual lasers of the array of lasers 2 to the common output waveguide 8, the different wavelengths emitted by the lasers need to be aligned with the AWG passbands.

A known method of achieving this is to measure the light output of the device 1 and then maximize the output power by tuning the individual laser wavelengths. In the remainder of this application the expressions tuning of the laser wavelengths and tuning the lasers are used interchangeably.

Tuning the lasers can be done for example by injection of electrical current into one or more specific tuning sections of the lasers. Other tuning methods include applying a reverse bias or changing the temperature of the lasers. It is however difficult to measure the output power efficiently without interrupting the signal. Therefore, a disadvantage of the known method is unacceptable downtime of a WDM system due to maintenance or servicing. As a result, the downtime of the WDM system would have to be carefully scheduled.

SUMMARY OF THE INVENTION

It is an object of the present invention to provide an integrated photonic component with improved centering of an optical field image of a WDM optical output signal and a common output waveguide of that component for pre-empting or at least reducing the disadvantage of the known method mentioned above. It is also an object of the invention to provide a photonic integrated circuit (PIC) for use in a WDM optical communication system, the PIC comprising the component according to the invention. Furthermore, it is an object of the invention to provide a method of improving centering of an optical field image of a WDM signal and a common output waveguide of at least one of the integrated photonic component and the PIC according to the invention.

In an embodiment of the integrated photonic component according to the invention, the component comprises:

at least a first and a second integrated laser diode, said at least first integrated laser diode being configured to provide a first optical input signal having a first wavelength, and said at least second integrated laser diode being configured to provide a second optical input signal having a second wavelength, said first and second wavelengths being unequal;

an arrayed waveguide grating, AWG, having a central channel wavelength, $\lambda_0$, a channel spacing, $\Delta\lambda$, a central diffraction order, and at least a first higher diffraction order lying at least one free spectral range, FSR, from the central diffraction order, the AWG further having an input slab region and an output slab region that are in optical communication by an array of waveguides, the waveguides of said array of waveguides having a length increment from one waveguide to the next, the waveguides of said array of waveguides each having a passband around a center wavelength, said center wavelength being equal to $\lambda_0 \pm n\Delta\lambda$, n being an integer, the input slab region further being in optical communication with at least a first input waveguide that is also in optical communication with said at least first laser diode for receiving the first optical input signal having the first wavelength, the input slab region further being in optical communication with at least a second input waveguide that is also in optical communication with said at least second laser diode for receiving the second optical input signal having the second wavelength, the output slab region further being in optical communication with at least a first central waveguide, wherein in the case of one central waveguide said at least first central waveguide being a common output waveguide that is arranged at a position coinciding with the central diffraction order of the AWG for receiving a wavelength division multiplexing, WDM, optical output signal comprising the first and second wavelengths of the first and second optical input signals, said WDM optical output signal further having an amount of output power and an optical field image;

at least a first photodetector being in optical communication with the output slab region of the AWG, said at least first photodetector being configured to measure at least one of a part of the amount of output power of the WDM optical output signal that is present in said at least first higher diffraction order lying at least one FSR from the central diffraction order, and an optical field image of the WDM optical output signal that is present in said at least first higher diffraction order;

a tuning arrangement being in communication with said at least first and second laser diodes, the tuning arrangement being configured to tune said at least first and second wavelengths to the respective center wavelengths, $\lambda_0 \pm n\Delta\lambda$, of the passbands of each of the waveguides of the array of waveguides of the AWG;

a control unit being in communication with said at least first photodetector for receiving at least one signal relating to at least one of said part of the amount of output power, and the optical field image of the WDM optical output signal that is present in said at least first higher diffraction order, wherein the control unit is configured to determine an amount of detuning between the optical field image of the WDM optical output signal that is present at the central diffraction order of the AWG and the common output waveguide, wherein the control unit is further in communication with said tuning arrangement for providing to the tuning arrangement at least one control signal relating to the determined amount of detuning so as to tune said at least first and second wavelengths to the respective center wavelengths, $\lambda_0 \pm n\Delta\lambda$, of the passbands of each of the waveguides of the array of waveguides of the AWG for improving the centering of the optical field image of the WDM optical output signal that is present at the central diffraction order of the AWG and the common output waveguide.

An integrated photonic component according to the embodiment of the invention mentioned above enables maximizing the signal from the at least first photodetector while tuning the at least first and second wavelengths of the at least first and second laser diodes to the respective center wavelengths, $\lambda_0 \pm n\Delta\lambda$, of the passbands of each of the waveguides of the array of waveguides of the AWG, without having to interrupt the WDM optical output signal on the common output waveguide. Therefore, no downtime of the WDM optical communication system comprising the integrated photonic component according to the invention is required for improving the centering of the optical field image of the WDM optical output signal that is present at the central diffraction order of the AWG and the common output waveguide. In this way, the coupling of the optical output power of the laser diodes to the common output waveguide can be optimized in a more convenient way.

It will be appreciated by the person skilled in the art that at least a first higher diffraction order is interchangeable with at least a first lower diffraction order. Moreover, the higher/lower the diffraction order, i.e. the higher the amount of FRS that such order lies away from the central diffraction order of the AWG, the lower the output power of the WDM signal present at that particular higher/low diffraction order will be. Therefore, in the context of this invention the first higher/lower diffraction order that lies one FSR away from the central diffraction order of the AWG is preferred. However, the skilled person will appreciate that the scope of the present invention is not limited to the first higher/lower diffraction order of the AWG an can advantageously be applied to other higher/lower diffraction orders as well.

In an embodiment of the integrated photonic component according to the invention, the component further comprises at least a second central waveguide that is arranged at the output slab region of the AWG at a first position coinciding with said at least first higher diffraction order of the AWG lying at least one FSR from the central diffraction order of the AWG that is received by the common output waveguide, wherein said at least first photodetector is in optical communication with said at least second central waveguide for measuring at least one of a part of the amount of output power, and the optical field image of the WDM optical output signal that is present in said at least first higher diffraction order.

In this way, at least one of a part of the amount of output power, and the optical field image of the WDM optical output signal that is present in said at least first higher diffraction order can be measured for detuning purposes without having to interrupt the WDM optical output signal in the common output waveguide.

In an embodiment of the integrated photonic component according to the invention, the component further comprises at least a third central waveguide that is arranged at the output slab region of the AWG at a second position coinciding with said at least first higher diffraction order of the AWG lying at least one FSR from the central diffraction order of the AWG that is received by the common output waveguide, wherein the integrated photonic component further comprises at least a second photodetector being in optical communication with said at least third central waveguide for measuring at least one of a part of the amount of output power, and the optical field image of the WDM optical output signal that is present in said at least first higher diffraction order, said at least second photodetector further being in communication with the control unit.

In this way, the robustness of the integrated photonic component can be improved by increasing the redundancy of the waveguides and photodetectors used for measuring at least one of a part of the amount of output power, and the optical field image of the WDM optical output signal that is present in said at least first higher diffraction order.

In an embodiment of the integrated photonic component according to the invention, the component further comprises at least a first and a second adjacent waveguide, said at least first and second adjacent waveguides being arranged on either side of said at least second central waveguide, wherein the integrated photonic component further comprises at least a first and a second adjacent waveguide photodetector, said at least first and second adjacent waveguide photodetectors being in optical communication with said at least first and second adjacent waveguides, respectively, said at least first and second adjacent waveguide photodetectors further being in communication with the control unit.

In this way, the sensitivity of detecting slight detuning between the optical field image of the WDM optical output signal that is present in said at least first higher diffraction order and said at least second central waveguide can be increased. In the context of the present invention, the term detuning refers to the mismatch between the optical field image and a profile of the at least one waveguide that measure at least one of the optical field image and the output power of the WDM signal.

In an embodiment of the integrated photonic component according to the invention, the component further comprises at least a third and a fourth adjacent waveguide, said at least third and fourth adjacent waveguide being arranged on either side of said at least third central waveguide, wherein the integrated photonic component further comprises at least a third and a fourth adjacent waveguide photodetector, said at least third and fourth adjacent waveguide photodetectors being in optical communication with said at least third and fourth adjacent waveguides, respectively, said at least third and fourth adjacent waveguide photodetectors further being in communication with the control unit.

In this way, the robustness of the integrated photonic component can be further improved by increasing the redundancy of the waveguides and photodetectors used for measuring at least one of a part of the amount of output power, and the optical field image of the WDM optical output signal that is present in said at least first higher diffraction order.

In an embodiment of the integrated photonic component according to the invention, said at least second and third central waveguides have a first width and said at least first, second, third, and fourth adjacent waveguides have a second width, said first width being smaller than said second width.

Contrary to the central diffraction order of the AWG, at higher/lower diffraction orders there is freedom to make the central waveguide narrower. In this way, the amount of output power in the adjacent waveguides increases. As a result, the sensitivity of detecting slight detuning between the optical field image of the WDM optical output signal that is present in said at least first higher diffraction order and said at least second central waveguide can further be increased.

In an embodiment of the integrated photonic component according to the invention, the component further comprises at least a first and a second adjacent waveguide, said at least first and second adjacent waveguides being arranged at the output slab region of the AWG on either side of a first position coinciding with said at least first higher diffraction order of the AWG lying at least one FSR from the central diffraction order of the AWG that is received by the common output waveguide, wherein the integrated photonic component further comprises at least a first and a second adjacent waveguide photodetector, said at least first and second adjacent waveguide photodetectors being in optical communication with said at least first and second adjacent waveguides, respectively, for measuring at least one of a part of the amount of output power, and the optical field image of the WDM optical output signal that is present in said at least first higher diffraction order, said at least first and second adjacent waveguide photodetectors further being in communication with the control unit.

By not applying a central waveguide and only using adjacent waveguides for measuring at least one of a part of the amount of output power, and the optical field image of the WDM optical output signal that is present in said at least first higher diffraction order at said first position, the sensitivity of detecting slight detuning between the optical field image of the WDM optical output signal in said at least first higher diffraction order and said at least first and second adjacent waveguides can even further be increased.

In an embodiment of the integrated photonic component according to the invention, the component further comprises at least a third and a fourth adjacent waveguide, said at least third and fourth adjacent waveguides being arranged at the output slab region of the AWG on either side of a second position coinciding with said at least first higher diffraction order of the AWG lying at least one FSR from the central diffraction order of the AWG that is received by the common output waveguide, wherein the integrated photonic component further comprises at least a third and a fourth adjacent waveguide photodetector, said at least third and fourth adjacent waveguide photodetectors being in optical communication with said at least third and fourth adjacent waveguides, respectively, for measuring at least one of a part of the amount of output power, and the optical field image of the WDM optical output signal that is present in said at least first higher diffraction order, said at least third and fourth adjacent waveguide photodetectors further being in communication with the control unit.

In this way, the robustness of the integrated photonic component can be further improved by increasing the redundancy of the waveguides and photodetectors used for measuring at least one of a part of the amount of output power, and the optical field image of the WDM optical output signal that is present in said at least first higher diffraction order.

In an embodiment of the integrated photonic component according to the invention, the component further comprises a first set of at least m+1 adjacent waveguides having at least m spacings with m centers between them, m being a natural number, said first set of at least m+1 adjacent waveguides being arranged at the output slab region of the AWG at a first position coinciding with said at least first higher diffraction order of the AWG, wherein the integrated photonic component further comprises a first set of at least m+1 adjacent waveguide photodetectors that are in optical communication with said first set of at least m+1 adjacent waveguides for measuring at least one of a part of the amount of output power, and the optical field image of a WDM optical output signal that is present in said at least first higher diffraction order, said WDM optical output signal comprising m peaks, wherein said first set of at least m+1 adjacent waveguide photodetectors are in communication with the control unit that is configured to determine the amount of detuning between the m peaks of the optical field image of the WDM optical output signal and the m centers of the m spacings between said at least m+1 adjacent waveguides of the first set, wherein the control unit is further in communication with said tuning arrangement that is configured for improving the centering of the m peaks of the optical field image of the WDM optical output signal and the m centers of the m spacings between said at least m+1 adjacent waveguides of the first set.

In this way, improving the centering of the optical field image of the WDM optical output signal is also possible in the case that the optical field image comprises more than one peak.

In an embodiment of the integrated photonic component according to the invention, the component further comprises a second set of at least m+1 adjacent waveguides having at least m spacings with m centers between them, said second set of at least m+1 adjacent waveguides being arranged at the output slab region of the AWG at a second position coinciding with said at least first higher diffraction order of the AWG, wherein the integrated photonic component further comprises a second set of at least m+1 adjacent waveguide photodetectors that are in optical communication with said second set of at least m+1 adjacent waveguides, for measuring at least one of a part of the amount of output power, and the optical field image of the WDM optical output signal that is present in said at least first higher diffraction order, said WDM optical output signal comprising m peaks, wherein said second set of at least m+1 adjacent waveguide photodetectors are in communication with the control unit that is configured to determine the amount of detuning between the m peaks of the optical field image of the WDM optical output signal and the m centers of the m spacings between said at least m+1 adjacent waveguides of the second set, wherein the control unit is further in communication with said tuning arrangement that is configured for improving the centering of the m peaks of the optical field image of the WDM optical output signal and the m centers of the m spacings between said at least m+1 adjacent waveguides of the second set.

In this way, the robustness of the integrated photonic component can be further improved by increasing the redundancy of the waveguides and photodetectors used for measuring at least one of a part of the amount of output power, and the optical field image of the WDM optical output signal that is present in said at least first higher diffraction order.

In an embodiment of the integrated photonic component according to the invention, the natural number m is one of 1 and 2.

In an embodiment of the integrated photonic component according to the invention, the component further comprises at least a fifth and a sixth adjacent waveguide, said at least fifth and sixth adjacent waveguides being arranged on either side of the common output waveguide at the output slab region of the AWG, wherein the integrated photonic component further comprises at least a fifth and a sixth adjacent waveguide photodetector, said at least fifth and sixth adjacent waveguide photodetectors being in optical communication with said at least fifth and sixth adjacent waveguides, respectively, for measuring at least one of a part of the amount of output power, and the optical field image of the WDM optical output signal that is present at the central diffraction order of the AWG that is received by the common output waveguide, said at least fifth and sixth adjacent waveguide photodetectors further being in communication with the control unit.

Although the amount of light captured by the fifth and sixth adjacent waveguides normally is rather low because the common output waveguide is designed not to lose any light, this embodiment provides a way of even further improving the robustness of the integrated photonic component.

In an embodiment of the integrated photonic component according to the invention, the central waveguide photodetectors and the adjacent waveguide photodetectors are at least one of balanced photodetectors and single photodetectors.

In an embodiment of the integrated photonic component according to the invention, the tuning arrangement comprises at least one of a thermal electrode, a reverse bias field-effect electrode, and a forward bias current-injection electrode.

An aspect of the invention is a photonic integrated circuit, PIC, for use in a WDM optical communication system, wherein the PIC comprises the integrated photonic component according to the invention.

An aspect of the invention is a method of improving centering of an optical field image of a wavelength division multiplexing, WDM, optical output signal and a common output waveguide, the method comprising:

as a first step, providing at least one of the integrated photonic component and the photonic integrated circuit, PIC, according to the invention;

as a second step, measuring at least one of a part of an amount of output power and an optical field image of a WDM optical output signal that is present in at least a first higher diffraction order of the AWG of the integrated photonic component, said at least first higher diffraction order lying at least one FSR from the central diffraction order of the AWG;

as a third step, determining an amount of detuning between the optical field image of the WDM optical output signal at said at least first higher diffraction order of the AWG and at least one waveguide profile of at least one waveguide that is arranged at the output slab region of the AWG at least at a first position that coincides with said at least first higher diffraction order of the AWG;

as a fourth step, calculating an amount of detuning between the optical field image of the WDM optical output signal that is present at the central diffraction order of the AWG and the waveguide profile of the common output waveguide of the AWG of the integrated photonic component;

as a fifth step, providing at least one control signal from the control unit to the tuning arrangement of the integrated photonic component to configure the tuning arrangement to tune at least a first and a second wavelength of the WDM optical output signal to respective center wavelengths, $\lambda 0 \pm n\Delta\lambda$, of the passbands of each of the waveguides of the array of waveguides of the AWG of the integrated photonic component;

as a sixth step, re-measuring at least one of a part of the amount of output power and the optical field image of the WDM optical output signal that is present in said at least first higher diffraction order of the AWG in order to determine if the amount of detuning between the optical field image at said at least first higher diffraction order of the AWG and said at least one waveguide profile of said at least one waveguide at said at least first position that coincides with said at least first higher diffraction order of the AWG has been reduced to a predetermined amount, the predetermined amount of detuning preferably being zero; and as a seventh step, repeating at least one of the second, third, fourth, fifth, and sixth steps until the predetermined amount of detuning has been reached.

This method provides an accurate and more convenient way of improving centering of an optical field image of a wavelength division multiplexing, WDM, optical output signal and a common output waveguide of an integrated photonic component or a photonic integrated circuit according to the invention because it is not necessary to interrupt the WDM output signal. Therefore downtime of the WDM optical communication system can be reduced.

BRIEF DESCRIPTION OF THE DRAWINGS

On the attached drawing sheets,

FIG. 8a schematically shows detuning between the optical field image of the WDM optical output signal and the waveguide profiles of the second central waveguide and two adjacent waveguides that are arranged at a first position of a first higher diffraction order of the AWG. The difference with the embodiment as shown in FIG. 7a is that the central waveguide as shown in FIG. 8a has a smaller width than the width of the central waveguide shown in FIG. 7a;

The figures are not necessarily drawn to scale. In the figures identical components are denoted by the same reference numerals.

DETAILED DESCRIPTION

The abovementioned and other features and effects of the present invention will be explained in more detail below with reference to the abovementioned drawings in which preferred and illustrative embodiments of the invention are shown. The skilled person will realize that other alternatives and equivalent embodiments of the invention can be conceived and reduced to practice without departing from the scope of the present invention.

Figure 1:
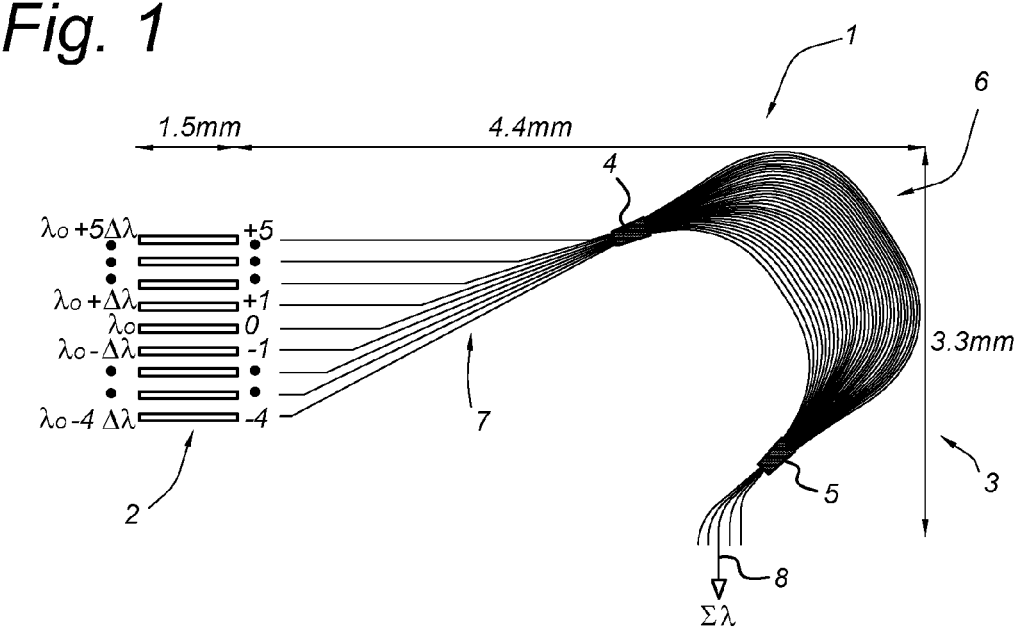
FIG. 1 schematically shows a known integrated multi-wavelength laser comprising an array of Distributed Bragg Reflector (DBR) lasers and an integrated arrayed waveguide grating (AWG) or Phased Array (PHASAR)
Figure 2:
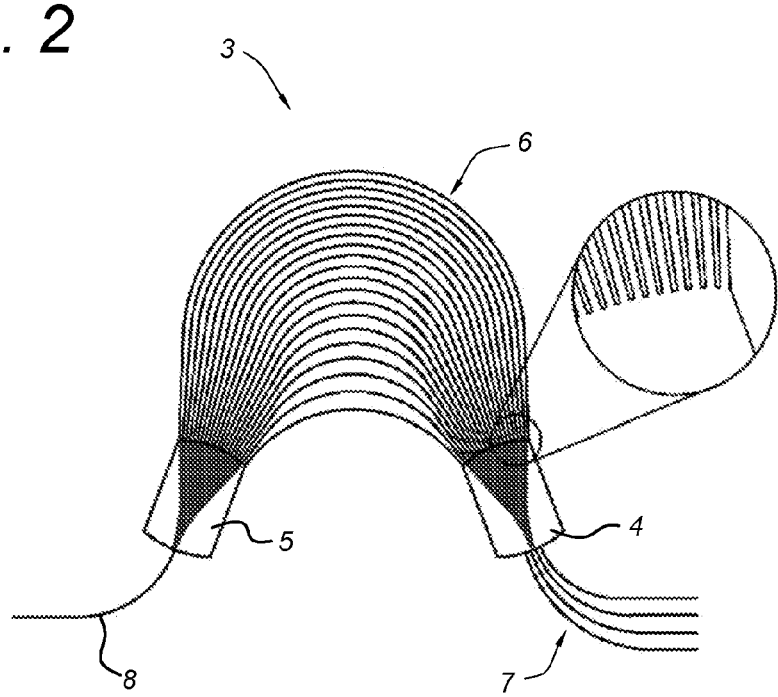
FIG. 2 schematically shows a basic layout of a known AWG.

FIGS. 1 and 2 have been discussed in the introduction reciting the background of the invention.

Using Higher Diffraction Orders

Figure 3:
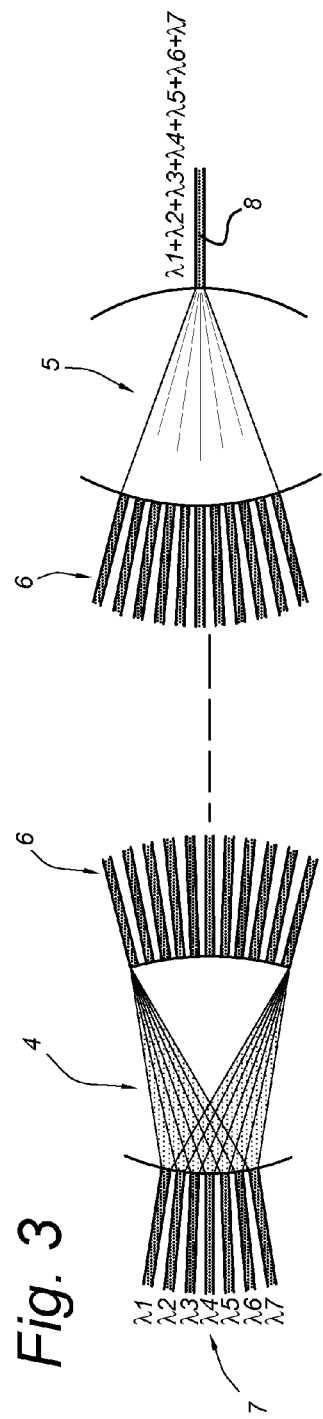
FIG. 3 schematically shows an input slab region or input free propagation region (FPR) and an output slab region or output FPR of an AWG in normal operation. The array of waveguides that optically connects the input and output FPRs is not shown.

The present invention provides a solution for the problem of the prior art, i.e. having to interrupt the WDM optical output signal for efficiently measuring the output power such that detuning can be reduced, by making use of higher/lower diffraction orders of the AWG. FIG. 3 schematically shows an input slab region or input free propagation region (FPR) 4 and an output slab region or output FPR 5 of an AWG 3 in normal operation, i.e. when all input wavelengths match the channel wavelengths of the AWG 3, the beams are perfectly focused on the common output waveguide 8. It is noted that the array of waveguides 6 that optically connects the input 4 and output 5 FPRs is not completely shown.

Figure 4:
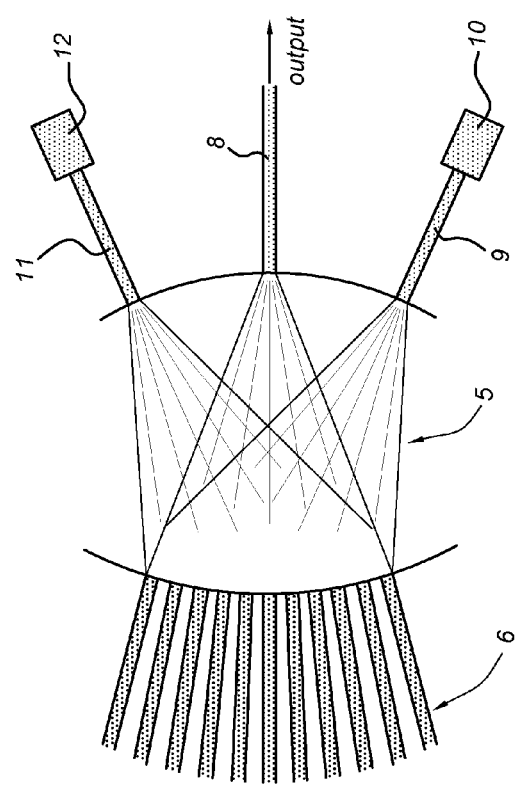
FIG. 4 schematically shows higher diffraction orders in the output or receive FPR.

However, due to the nature of the AWG, there are also focus points that lie one Free Spectral Range (FSR) further along the focal plane as is schematically shown in FIG. 4. Although these diffraction orders generally have a lower power than the central diffraction order, they can still be used effectively to optimize the laser wavelengths by measuring the light coupled to one or more photodetectors (PDs). Again, maximizing the signal from the PDs while tuning the laser wavelengths, will result in the optimal alignment of the laser wavelengths to the AWG passbands.

Wavelength Calibration Using a Central Waveguide

A possible issue in optimizing the output power to a waveguide that is centered to the optimal output position (or one of its higher diffraction orders) is that the Gaussian distribution of the optical field will result in a flat signal response at the optimal optical wavelength alignment. This is further explained in relation to FIGS. 5a-5c.

Figure 5A:
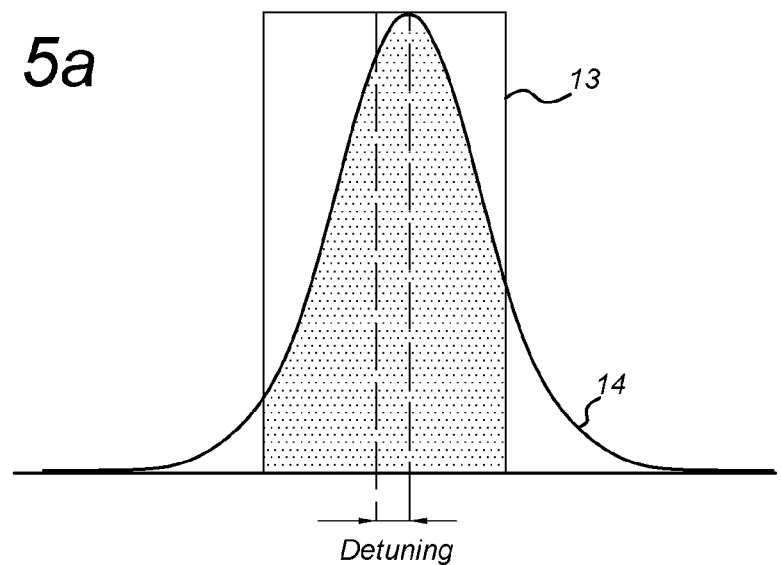
FIG. 5a schematically shows detuning between the optical field image of the WDM optical output signal and the waveguide profile of a receiver or central waveguide that is arranged at a higher diffraction order of the AWG.

FIG. 5a schematically shows detuning between the optical field image 14 of the WDM optical output signal and the waveguide profile 13 of a receiver or central waveguide 9, 11 that is arranged at a higher diffraction order of the AWG 3. In the context of the present invention, the term detuning refers to the mismatch between the optical field image 14 of the WDM output signal and the profile of the waveguides that measure at least one of the optical field image and the output power of the WDM signal. In the embodiment of the integrated photonic component of the invention wherein a second central waveguide 9 is arranged at a position on the output slab region 5 of the AWG 3 that coincides with a first higher diffraction order of the AWG, detuning refers to the mismatch between the optical field image 14 of the WDM optical output signal and the waveguide profile 13 of said second central waveguide 9.

Figure 5B:
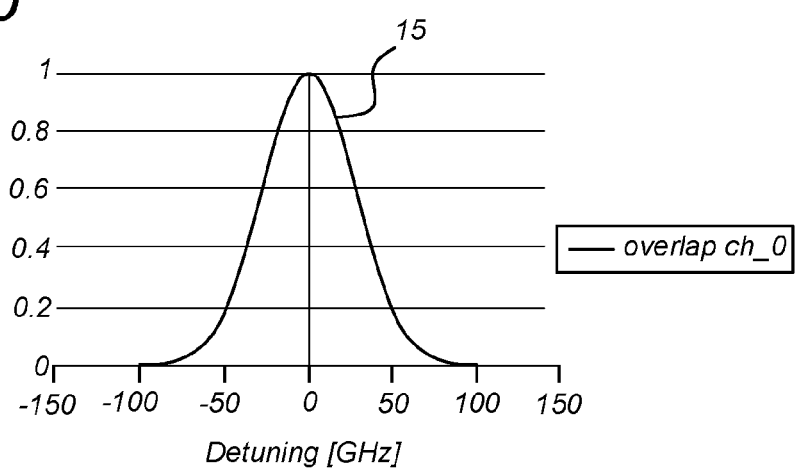
FIG. 5b schematically shows an overlap of the normalized output optical field of the WDM optical output signal as a function of the detuning in GHz with the receiver or central waveguide mode field.

FIG. 5b schematically shows an overlap of the normalized output optical field 15 of the WDM optical output signal as a function of the detuning in GHz with the mode field of the second central waveguide 9.

Figure 5C:
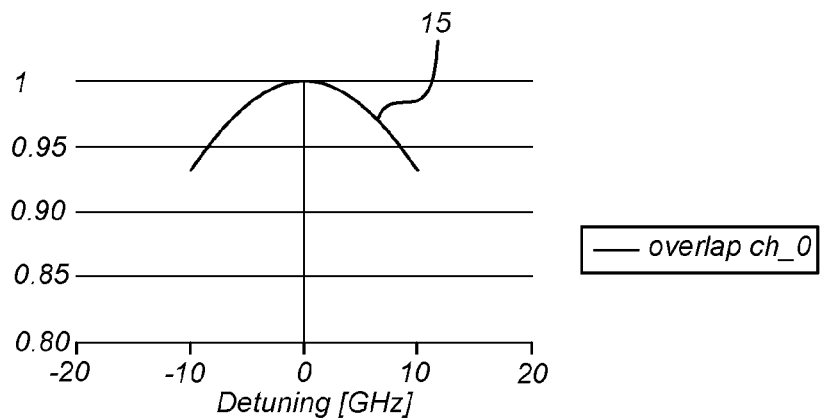
FIG. 5c schematically shows a part of the normalized output optical field of the WDM optical output signal as a function of the detuning in GHz in a detuning range of −10 GHz to +10 GHz.

FIG. 5c schematically shows a part of the normalized output optical field 15 of the WDM optical output signal as a function of the detuning in GHz in a detuning range of −10 GHz to +10 GHz. As can be determined from FIG. 5c, the difference between optimal detuning (=0GHz) and for example +/−5 GHz detuning is only about 2% of the maximum light output power. In addition, this is the case when all lasers of the array of lasers 2 are detuned by the same amount. If only one of the lasers of the array of lasers 2 is detuned, the difference becomes even smaller.

Using Adjacent Waveguides

Figure 6:
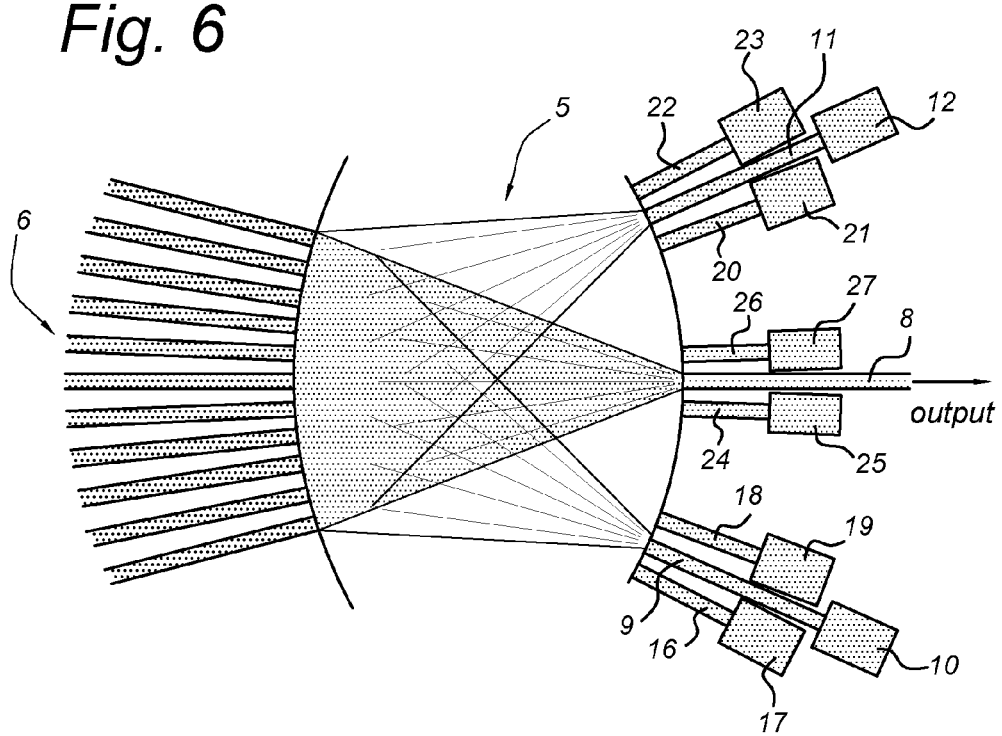
FIG. 6 schematically shows an embodiment of the output slab region of the AWG of the integrated photonic component according to the invention. The output slab region being in optical communication with central and adjacent waveguides at the output slab region or output FPR at both the positions of the central diffraction order and the higher diffraction orders. The central waveguides at the higher diffraction orders and the adjacent waveguides at both the central diffraction order and the higher diffraction orders are in optical communication with photodetectors (PDs)

One way of increasing the sensitivity at low detuning is to use waveguides adjacent to the central waveguide. FIG. 6 schematically shows an embodiment of the output slab region 5 of the AWG 3 of the integrated photonic component according to the invention. The output slab region 5 being in optical communication with a central waveguide 8 that is arranged at the central diffraction order of the AWG 3. The central waveguide 8 is used as common output for receiving the WDM optical output signal present at the central diffraction order.

The output slab region 5 is further in optical communication with a second central waveguide 9 that is arranged at a first position that coincides with the first higher diffraction order of the AWG 3. The second central waveguide 9 is in optical communication with a first photodetector 10 that is used for measuring at least one of the optical field image and the output power of the WDM optical output signal present at the first position of the first higher diffraction order.

The second central waveguide 9 is flanked on either side by a first 16 and a second 18 adjacent waveguide. The first adjacent waveguide 16 is in optical communication with a first adjacent photodetector 17 and the second adjacent waveguide 18 is in optical communication with a second adjacent photodetector 19. The first 16 and second 18 adjacent waveguides are provided for increasing the sensitivity of detecting slight detuning between the optical field image of the WDM optical output signal that is present at the first position coinciding with the first higher diffraction order and the second central waveguide 9.

The output slab region 5 of the AWG 3 is further in optical communication with a third central waveguide 11 that is arranged at a second position that coincides with the first higher diffraction order of the AWG 3. The third central waveguide 11 is in optical communication with a second photodetector 12 that is used for measuring at least one of the optical field image and the output power of the WDM optical output signal present at the second position of the first higher diffraction order.

The third central waveguide 11 is flanked on either side by a third 20 and a fourth 22 adjacent waveguide. The third adjacent waveguide 20 is in optical communication with a third adjacent photodetector 21 and the fourth adjacent waveguide 22 is in optical communication with a fourth adjacent photodetector 23. The third 20 and fourth 22 adjacent waveguides are provided for increasing the sensitivity of detecting slight detuning between the optical field image of the WDM optical output signal that is present at the second position coinciding with the first higher diffraction order and the third central waveguide 11. In addition, third central waveguide 11 and the third 20 and fourth 22 adjacent waveguides improve the robustness of the integrated photonic component 1 as also mentioned above.

The output slab region 5 of the AWG 3 is further in optical communication with a fifth 24 and a sixth 26 adjacent waveguide that are arranged on either side of the common output waveguide 8. The fifth adjacent waveguide 24 is in optical communication with a fifth adjacent photodetector 25 and the sixth adjacent waveguide 26 is in optical communication with a sixth adjacent photodetector 27. As mentioned above, although the amount of light captured by the fifth 24 and sixth 26 adjacent waveguides normally is rather low because the common output waveguide 8 is designed not to lose any light, this embodiment provides a way of even further improving the robustness of the integrated photonic component 1.

The adjacent waveguides 16, 18, 20, 22, 24, 26 capture the light that spills on the side of the central waveguides 8, 9, 11, which in an AWG demultiplexer would lead to crosstalk. By equalizing the amount of light captured by the adjacent waveguides or channels, the optical field is centralized. This is further explained in relation to FIGS. 7a-7c.

Figure 7A:
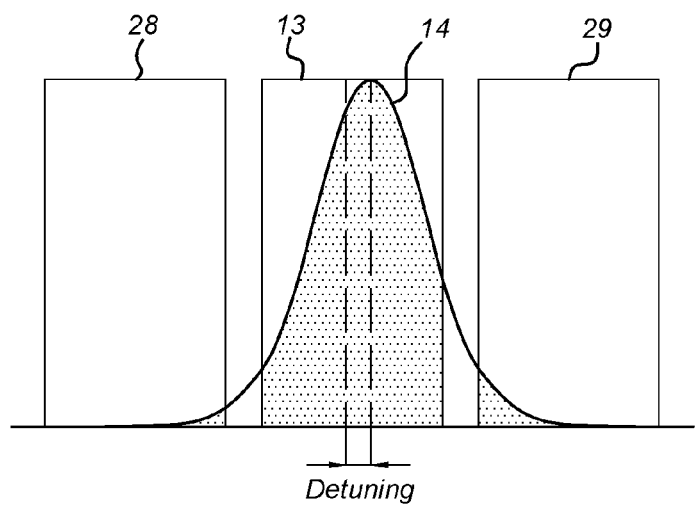
FIG. 7a schematically shows detuning between the optical field image of the WDM optical output signal and the waveguide profiles of the second central waveguide and two adjacent waveguides that are arranged at a first position that coincides with a first higher diffraction order of the AWG. The adjacent waveguides are arranged at opposite sides of the central waveguide.

FIG. 7a schematically shows detuning between the optical field image of the WDM optical output signal and the waveguide profile 13 of the second central waveguide 9 and the waveguide profiles 28, 29 of the first 16 and the second 18 adjacent waveguides respectively. The second central waveguide 9 and the first 16 and the second 18 adjacent waveguides are arranged at a first position that coincides with a first higher diffraction order of the AWG 3 of an embodiment of the integrated photonic component according to the invention. The skilled person will appreciate that also extra channels or waveguides can be applied around the even higher diffraction order images. The equalization can be done using balanced photodetectors or with single photodetectors.

Figure 7B:
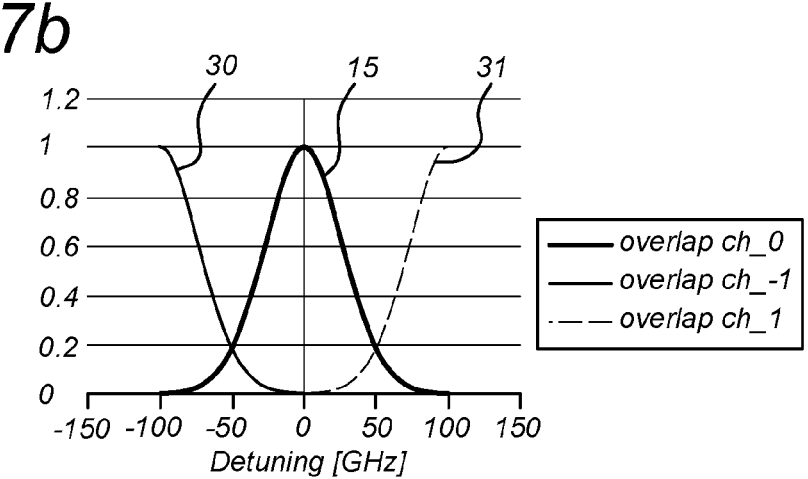
FIG. 7b schematically shows an overlap of the normalized output optical field of the WDM optical output signal as a function of the detuning in GHz with the mode fields of the second central waveguide and the two adjacent waveguides.

FIG. 7b schematically shows an overlap of the normalized output optical field 15, 30, 31 of the WDM optical output signal as a function of the detuning in GHz with the mode fields of the second central waveguide 9 and the first 16 and second 18 adjacent waveguides.

Figure 7C:
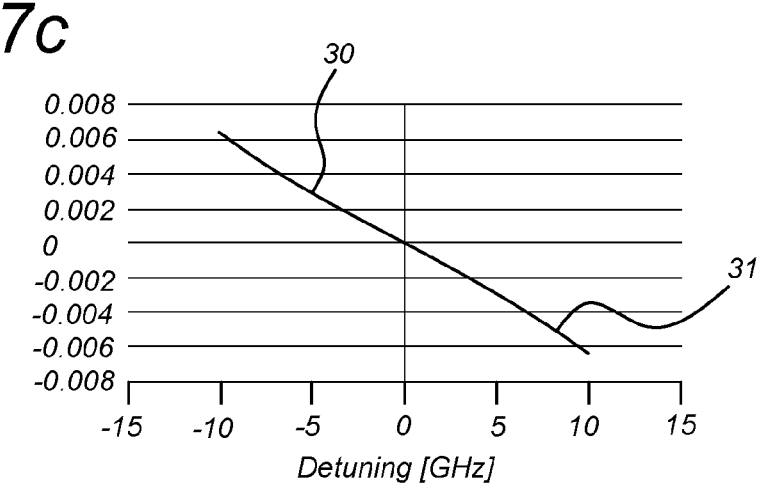
FIG. 7c schematically shows the difference in overlap between the mode fields of the adjacent waveguides as a function of the detuning in GHz in a detuning range of −10 GHz to +10 GHz.

FIG. 7c schematically shows the difference in overlap between the mode fields of the adjacent waveguides as a function of the detuning in GHz in a detuning range of −10 GHz to +10 GHz. Comparing FIGS. 5c and 7c, it can be concluded that the addition of the first 16 and the second 18 adjacent waveguides has resulted in a substantially linear difference or error function as a function of detuning instead of a quadratic difference or error function. The substantially linear error function enables higher sensitivity and therefore more accurate alignment.

On the higher diffraction orders there is freedom to make the width of the central waveguide 9, 11 narrower than the width of the adjacent waveguides 16, 18, 20, 22. As a result, the amount of power of the WDM signal in the adjacent channels increases. This will lead to higher sensitivity and therefore more accurate alignment. This is further explained in relation to FIGS. 8a-8c.

Figure 8A:
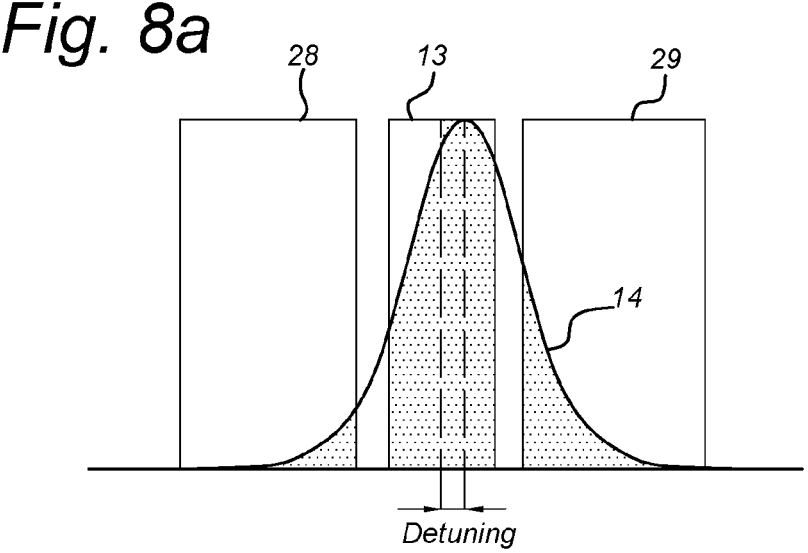

FIG. 8a schematically shows detuning between the optical field image 14 of the WDM optical output signal and the waveguide profiles 13 of the second central waveguide 9 and the waveguide profiles 28, 29 of the first 16 and the second 18 adjacent waveguides that are arranged at a position that coincides with a first higher diffraction order of the AWG. The difference with the embodiment as shown in FIG. 7a is that the second central waveguide 9 as shown in FIG. 8a has a smaller width than the width of the second central waveguide 9 shown in FIG. 7a.

Figure 8B:
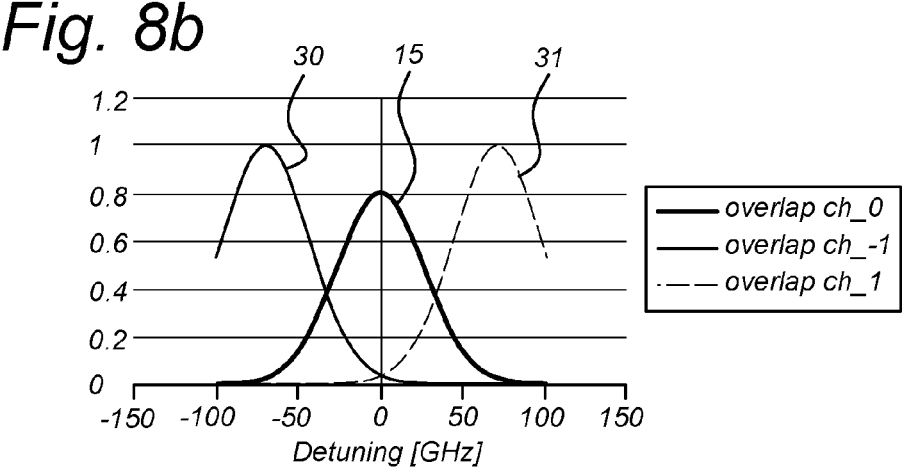
FIG. 8b schematically shows an overlap of the normalized output optical field of the WDM optical output signal as a function of the detuning in GHz with the mode fields of the second central waveguide and the two adjacent waveguides.

FIG. 8b schematically shows an overlap of the normalized output optical field 15, 30, 31 of the WDM optical output signal as a function of the detuning in GHz with the mode fields of the second central waveguide 9 and the first 16 and the second 18 adjacent waveguides.

Figure 8C:
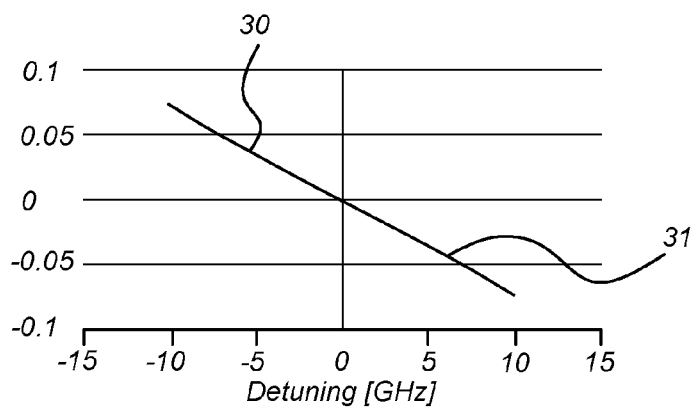
FIG. 8c schematically shows the difference in overlap between the mode fields of the adjacent waveguides as a function of the detuning in GHz in a detuning range of −10 GHz to +10 GHz.

FIG. 8c schematically shows the difference in overlap between the mode fields of the adjacent waveguides as a function of the detuning in GHz in a detuning range of −10 GHz to +10 GHz. Comparing FIGS. 7c and 8c, it can be concluded that by reducing the width of the second central waveguide 9, the sensitivity has been increased. This will enable an even more accurate alignment.

The lower limit of the central waveguide width is dependent on the lithography resolution. In the extreme case, the central waveguide can be completely removed from the higher order diffraction sites.

Figure 9:
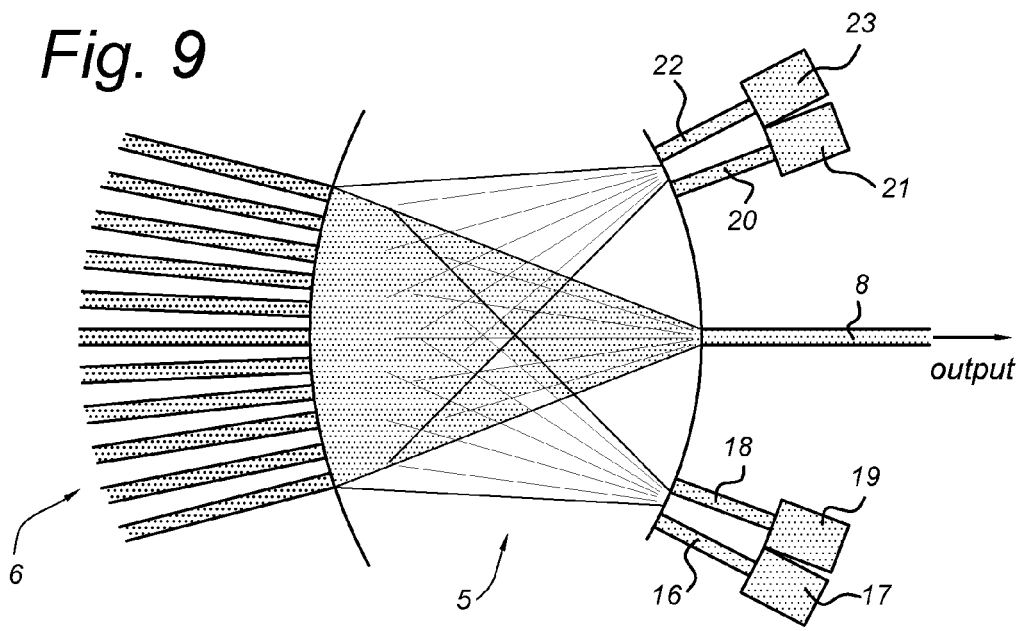
FIG. 9 schematically shows an embodiment of the output slab region of the AWG that is in optical communication with a first and a second adjacent waveguide, said first and second adjacent waveguides being arranged on either side of a first position coinciding with a first higher diffraction order of the AWG. The output slab region of the AWG further comprises a third and a fourth adjacent waveguide, said third and fourth adjacent waveguides being arranged on either side of a second position coinciding with the first higher diffraction order of the AWG. Each of the adjacent waveguides shown in FIG. 9 is in optical communication with an adjacent waveguide photodetector.

FIG. 9 schematically shows an embodiment of the output slab region 5 of the AWG 3 that is in optical communication with a first 16 and a second 18 adjacent waveguide that are arranged on either side of a first position that coincides with a first higher diffraction order of the AWG. The first adjacent waveguide 16 is in optical communication with a first adjacent photodetector 17 and the second adjacent waveguide 18 is in optical communication with a second adjacent photodetector 19.

The output slab region 5 of the AWG 3 is further in optical communication with a third 20 and a fourth 22 adjacent waveguide that are arranged on either side of a second position that coincides with the first higher diffraction order of the AWG. The third adjacent waveguide 20 is in optical communication with a third adjacent photodetector 21 and the fourth adjacent waveguide 22 is in optical communication with a fourth adjacent photodetector 23. The addition of the third 20 and fourth 22 adjacent waveguides improves the robustness of the integrated photonic component 1 as also mentioned above.

The embodiment of the integrated photonic component according to the present invention as shown in FIG. 9 achieves an even further improved sensitivity. This will be explained in more detail in relation to FIGS. 10a-10c.

Figure 10A:
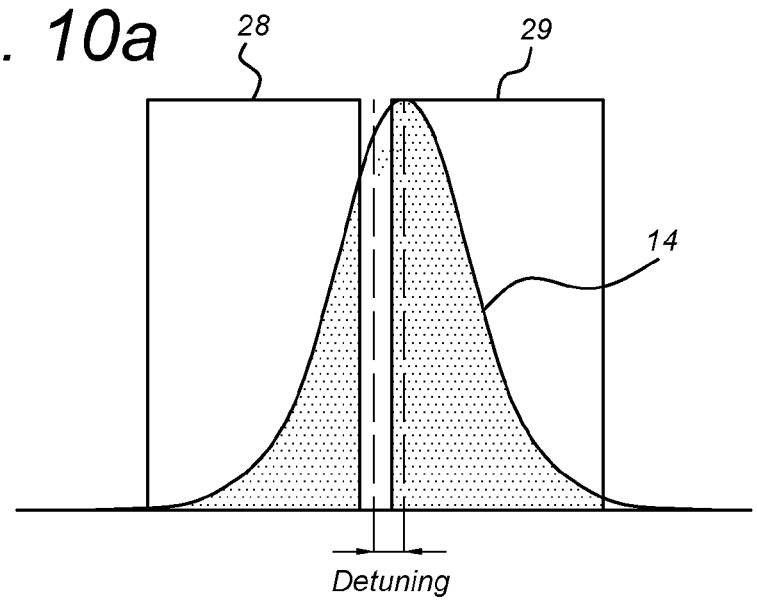
FIG. 10a schematically shows detuning between the optical field image of the WDM optical output signal and the waveguide profiles of two adjacent waveguides that are arranged on opposite sides of a first position that coincides with a first higher diffraction order of the AWG.

FIG. 10a schematically shows detuning between the optical field image 14 of the WDM optical output signal and the waveguide profiles 28, 29 of the first 16 and the second 18 adjacent waveguides that are arranged on opposite sides of a first position that coincides with a first higher diffraction order of the AWG.

Figure 10B:
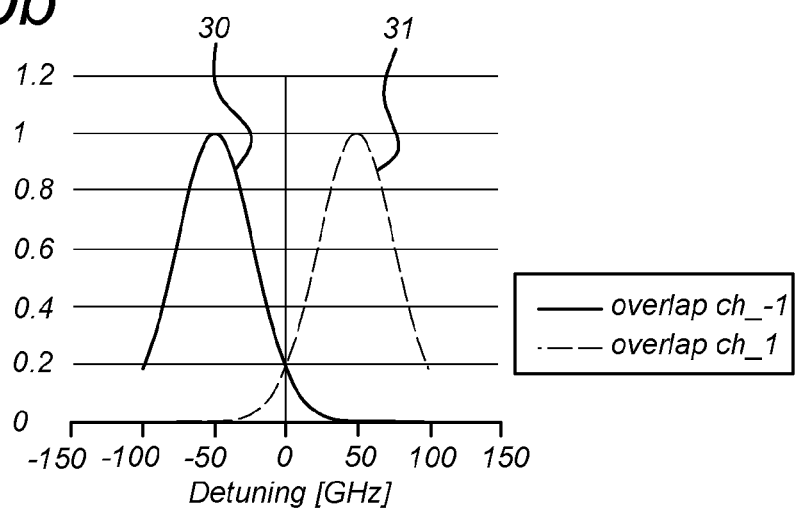
FIG. 10b schematically shows an overlap of the normalized output optical field of the WDM optical output signal as a function of the detuning in GHz with the mode fields of the two adjacent waveguides.

FIG. 10b schematically shows an overlap of the normalized output optical field 30, 31 of the WDM optical output signal as a function of the detuning in GHz with the mode fields of the first 16 and the second 18 adjacent waveguides.

Figure 10C:
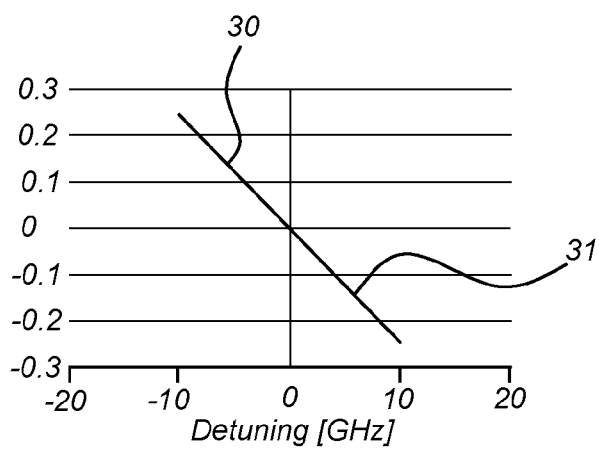
FIG. 10c schematically shows the difference in overlap between the mode fields of the adjacent waveguides as a function of the detuning in GHz in a detuning range of −10 GHz to +10 GHz.

FIG. 10c schematically shows the difference in overlap between the mode fields of the adjacent waveguides as a function of the detuning in GHz in a detuning range of −10 GHz to +10 GHz. Comparing FIGS. 8c and 10c, it can be concluded that by not using the second central waveguide 9, the sensitivity has even further been increased. This will lead to a further improvement regarding the accuracy of the alignment.

In the case that an embodiment of the integrated photonic component as shown in FIG. 9 is used, it is preferred to first align the lasers on one of the waveguides as shown in FIG. 5a before equalizing the signals from the first 16 and the second 18 adjacent waveguides to avoid forming a symmetric, but non-centered optical image. It is possible to do this initial optimization by changing the temperature of the AWG device so that the positions of the higher diffraction orders shift by a half channel spacing.

Optimization of a Multi-Peak Optical Field Image

For some applications the combined image of all the lasers might not have the shape of a single peak normal distribution as shown in the previous cases, but might consist of multiple peaks.

Figure 11:
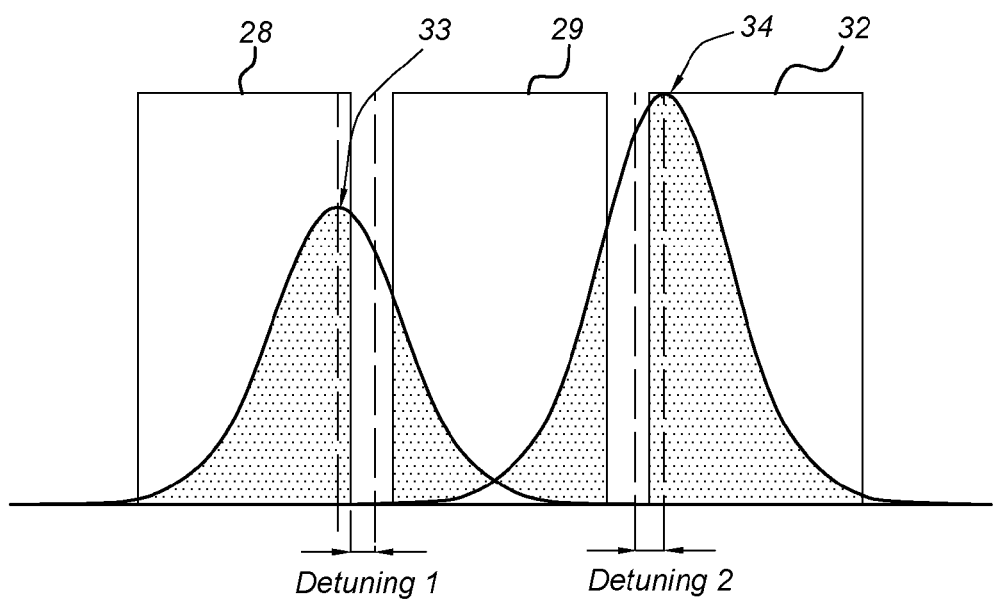
FIG. 11 schematically shows detuning between the two peaks of the optical field image of a WDM optical output signal and the two centers of the two spacings between the waveguide profiles of the three adjacent waveguides. The three adjacent waveguides are arranged at the output slab region of the AWG at a first position coinciding with a first higher diffraction order of the AWG.

FIG. 11 schematically shows detuning between two peaks of the optical field image of a WDM optical output signal and the two centers of the two spacings between the waveguide profiles of the three adjacent waveguides. The three adjacent waveguides are arranged at the output slab region of the AWG at a first position coinciding with a first higher diffraction order of the AWG.

It will be appreciated by the skilled person that the invention is not limited to three waveguides in the case of two peaks in the optical field image. Multiple waveguides can be used as well if considered advantageously. Furthermore, the principle illustrated in FIG. 11 can be used for more than two peaks in the optical field image. In addition, it might be used in de-multiplexer arrangements.

The present invention can be summarized as follows. The invention provides an integrated photonic component 1 with improved centering of an optical field image of a wavelength division multiplexing, WDM, optical output signal and a common output waveguide 8. In this way an efficient power coupling of the laser diodes of the integrated photonic component to the common output waveguide is achievable. The invention further provides a photonic integrated circuit, PIC, for use in a WDM optical communication system, the PIC comprising the component according to the invention. The invention further provides a method of improving centering of an optical field image of a WDM signal and a common output waveguide of at least one of the integrated photonic component and the PIC according to the invention.

In the foregoing, the invention has been described with reference to specific embodiments thereof. It will, however, be evident to the skilled person that various modifications and changes may be made thereto without departing from the scope of the invention as summarized in the attached claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. An integrated photonic component with improved centering of an optical field image of a wavelength division multiplexing, WDM, optical output signal and a common output waveguide, the component comprising:

at least a first and a second integrated laser diode, said at least first integrated laser diode being configured to provide a first optical input signal having a first wavelength, and said at least second integrated laser diode being configured to provide a second optical input signal having a second wavelength, said first and second wavelengths being unequal;

an arrayed waveguide grating, AWG, having a central channel wavelength, $\lambda_0$, a channel spacing, $\Delta\lambda$, a central diffraction order, and at least a first higher diffraction order lying at least one free spectral range, FSR, from the central diffraction order, the AWG further having an input slab region and an output slab region that are in optical communication by an array of waveguides, the waveguides of said array of waveguides having a length increment from one waveguide to the next, the waveguides of said array of waveguides each having a passband around a center wavelength, said center wavelength being equal to $\lambda_0 \pm n\Delta\lambda$, n being an integer, the input slab region further being in optical communication with at least a first input waveguide that is also in optical communication with said at least first laser diode for receiving the first optical input signal having the first wavelength, the input slab region further being in optical communication with at least a second input waveguide that is also in optical communication with said at least second laser diode for receiving the second optical input signal having the second wavelength, the output slab region further being in optical communication with at least a first central waveguide, wherein in the case of one central waveguide said at least first central waveguide being a common output waveguide that is arranged at a position coinciding with the central diffraction order of the AWG for receiving a wavelength division multiplexing, WDM, optical output signal comprising the first and second wavelengths of the first and second optical input signals, said WDM optical output signal further having an amount of output power and an optical field image;

at least a first photodetector being in optical communication with the output slab region of the AWG, said at least first photodetector being configured to measure at least one of a part of the amount of output power of the WDM optical output signal that is present in said at least first higher diffraction order lying at least one FSR from the central diffraction order, and an optical field image of the WDM optical output signal that is present in said at least first higher diffraction order;

a tuning arrangement being in communication with said at least first and second laser diodes, the tuning arrangement being configured to tune said at least first and second wavelengths to the respective center wavelengths, $\lambda_0 \pm n\Delta\lambda$, of the passbands of each of the waveguides of the array of waveguides of the AWG;

a control unit being in communication with said at least first photodetector for receiving at least one signal relating to at least one of said part of the amount of output power, and the optical field image of the WDM optical output signal that is present in said at least first higher diffraction order, wherein the control unit is configured to determine an amount of detuning between the optical field image of the WDM optical output signal that is present at the central diffraction order of the AWG and the common output waveguide, wherein the control unit is further in communication with said tuning arrangement for providing to the tuning arrangement at least one control signal relating to the determined amount of detuning so as to tune said at least first and second wavelengths to the respective center wavelengths, $\lambda_0 \pm n\Delta\lambda$, of the passbands of each of the waveguides of the array of waveguides of the AWG for improving the centering of the optical field image of the WDM optical output signal that is present at the central diffraction order of the AWG and the common output waveguide; and at least a second central waveguide that is arranged at the output slab region of the AWG at a first position coinciding with said at least first higher diffraction order of the AWG lying at least one FSR from the central diffraction order of the AWG that is received by the common output waveguide, wherein said at least first photodetector is in optical communication with said at least second central waveguide for measuring at least one of a part of the amount of output power, and the optical field image of the WDM optical output signal that is present in said at least first higher diffraction order.

2. The integrated photonic component according to claim 1, further comprising at least a third central waveguide that is arranged at the output slab region of the AWG at a second position coinciding with said at least first higher diffraction order of the AWG lying at least one FSR from the central diffraction order of the AWG that is received by the common output waveguide, wherein the integrated photonic component further comprises at least a second photodetector being in optical communication with said at least third central waveguide for measuring at least one of a part of the amount of output power, and the optical field image of the WDM optical output signal that is present in said at least first higher diffraction order, said at least second photodetector further being in communication with the control unit.

3. The integrated photonic component according to claim 1, further comprising at least a first and a second adjacent waveguide, said at least first and second adjacent waveguides being arranged on either side of said at least second central waveguide, wherein the integrated photonic component further comprises at least a first and a second adjacent waveguide photodetector, said at least first and second adjacent waveguide photodetectors being in optical communication with said at least first and second adjacent waveguides, respectively, said at least first and second adjacent waveguide photodetectors further being in communication with the control unit.

4. The integrated photonic component according to claim 2, further comprising at least a third and a fourth adjacent waveguide, said at least third and fourth adjacent waveguide being arranged on either side of said at least third central waveguide, wherein the integrated photonic component further comprises at least a third and a fourth adjacent waveguide photodetector, said at least third and fourth adjacent waveguide photodetectors being in optical communication with said at least third and fourth adjacent waveguides, respectively, said at least third and fourth adjacent waveguide photodetectors further being in communication with the control unit.

5. The integrated photonic component according to claim 3, wherein said at least second and third central waveguides have a first width and said at least first, second, third, and fourth adjacent waveguides have a second width, said first width being smaller than said second width.

6. The integrated photonic component according to claim 1, further comprising at least a first and a second adjacent waveguide, said at least first and second adjacent waveguides being arranged at the output slab region of the AWG on either side of a first position coinciding with said at least first higher diffraction order of the AWG lying at least one FSR from the central diffraction order of the AWG that is received by the common output waveguide, wherein the integrated photonic component further comprises at least a first and a second adjacent waveguide photodetector, said at least first and second adjacent waveguide photodetectors being in optical communication with said at least first and second adjacent waveguides, respectively, for measuring at least one of a part of the amount of output power, and the optical field image of the WDM optical output signal that is present in said at least first higher diffraction order, said at least first and second adjacent waveguide photodetectors further being in communication with the control unit.

7. The integrated photonic component according to claim 6, further comprising at least a third and a fourth adjacent waveguide, said at least third and fourth adjacent waveguides being arranged at the output slab region of the AWG on either side of a second position coinciding with said at least first higher diffraction order of the AWG lying at least one FSR from the central diffraction order of the AWG that is received by the common output waveguide, wherein the integrated photonic component further comprises at least a third and a fourth adjacent waveguide photodetector, said at least third and fourth adjacent waveguide photodetectors being in optical communication with said at least third and fourth adjacent waveguides, respectively, for measuring at least one of a part of the amount of output power, and the optical field image of the WDM optical output signal that is present in said at least first higher diffraction order, said at least third and fourth adjacent waveguide photodetectors further being in communication with the control unit.

8. The integrated photonic component according to claim 1, further comprising a first set of at least m+1 adjacent waveguides having at least m spacings with m centers between them, m being a natural number, said first set of at least m+1 adjacent waveguides being arranged at the output slab region of the AWG at a first position coinciding with said at least first higher diffraction order of the AWG, wherein the integrated photonic component further comprises a first set of at least m+1 adjacent waveguide photodetectors that are in optical communication with said first set of at least m+1 adjacent waveguides, for measuring at least one of a part of the amount of output power, and the optical field image of a WDM optical output signal that is present in said at least first higher diffraction order, said WDM optical output signal comprising m peaks, wherein said first set of at least m+1 adjacent waveguide photodetectors are in communication with the control unit that is configured to determine the amount of detuning between the m peaks of the optical field image of the WDM optical output signal and the m centers of the m spacings between said at least m+1 adjacent waveguides of the first set, wherein the control unit is further in communication with said tuning arrangement that is configured for improving the centering of the m peaks of the optical field image of the WDM optical output signal and the m centers of the m spacings between said at least m+1 adjacent waveguides of the first set.

9. The integrated photonic component according to claim 8, further comprising a second set of at least m+1 adjacent waveguides having at least m spacings with m centers between them, said second set of at least m+1 adjacent waveguides being arranged at the output slab region of the AWG at a second position coinciding with said at least first higher diffraction order of the AWG, wherein the integrated photonic component further comprises a second set of at least m+1 adjacent waveguide photodetectors that are in optical communication with said second set of at least m+1 adjacent waveguides, for measuring at least one of a part of the amount of output power, and the optical field image of the WDM optical output signal that is present in said at least first higher diffraction order, said WDM optical output signal comprising m peaks, wherein said second set of at least m+1 adjacent waveguide photodetectors are in communication with the control unit that is configured to determine the amount of detuning between the m peaks of the optical field image of the WDM optical output signal and the m centers of the m spacings between said at least m+1 adjacent waveguides of the second set, wherein the control unit is further in communication with said tuning arrangement that is configured for improving the centering of the m peaks of the optical field image of the WDM optical output signal and the m centers of the m spacings between said at least m+1 adjacent waveguides of the second set.

10. The integrated photonic component according to claim 8, wherein the natural number m is one of 1 and 2.

11. The integrated photonic component according to claim 1, further comprising at least a fifth and a sixth adjacent waveguide, said at least fifth and sixth adjacent waveguides being arranged on either side of the common output waveguide at the output slab region of the AWG, wherein the integrated photonic component further comprises at least a fifth and a sixth adjacent waveguide photodetector, said at least fifth and sixth adjacent waveguide photodetectors being in optical communication with said at least fifth and sixth adjacent waveguides, respectively, for measuring at least one of a part of the amount of output power, and the optical field image of the WDM optical output signal that is present at the central diffraction order of the AWG that is received by the common output waveguide, said at least fifth and sixth adjacent waveguide photodetectors further being in communication with the control unit.

12. The integrated photonic component according to claim 1, wherein the central waveguide photodetectors and the adjacent waveguide photodetectors are at least one of balanced photodetectors and single photodetectors.

13. The integrated photonic component according to claim 1, wherein the tuning arrangement comprises at least one of a thermal electrode, a reverse bias field-effect electrode, and a forward bias current-injection electrode.

14. A photonic integrated circuit, PIC, for use in a WDM optical communication system, wherein the PIC comprises the integrated photonic component according to claim 1.

15. A method of improving centering of an optical field image of a wavelength division multiplexing, WDM, optical output signal and a common output waveguide, the method comprising:
   as a first step, providing at least one of the integrated photonic component according to claim 1 and a photonic integrated circuit, PIC, comprising the integrated photonic component;
   as a second step, measuring at least one of a part of an amount of output power and an optical field image of a WDM optical output signal that is present in at least a first higher diffraction order of the AWG of the integrated photonic component, said at least first higher diffraction order lying at least one FSR from the central diffraction order of the AWG;

as a third step, determining an amount of detuning between the optical field image of the WDM optical output signal at said at least first higher diffraction order of the AWG and at least one waveguide profile of at least one waveguide that is arranged at the output slab region of the AWG at least at a first position that coincides with said at least first higher diffraction order of the AWG;

as a fourth step, calculating an amount of detuning between the optical field image of the WDM optical output signal that is present at the central diffraction order of the AWG and the waveguide profile of the common output waveguide of the AWG of the integrated photonic component;

as a fifth step, providing at least one control signal from the control unit to the tuning arrangement of the integrated photonic component to configure the tuning arrangement to tune at least a first and a second wavelength of the WDM optical output signal to respective center wavelengths, $\lambda_o \pm n\Delta\lambda$, of the passbands of each of the waveguides of the array of waveguides of the AWG of the integrated photonic component;

as a sixth step, re-measuring at least one of a part of the amount of output power and the optical field image of the WDM optical output signal that is present in said at least first higher diffraction order of the AWG in order to determine if the amount of detuning between the optical field image at said at least first higher diffraction order of the AWG and said at least one waveguide profile of said at least one waveguide at said at least first position that coincides with said at least first higher diffraction order of the AWG has been reduced to a predetermined amount, the predetermined amount of detuning preferably being zero; and as a seventh step, repeating at least one of the second, third, fourth, fifth, and sixth steps until the predetermined amount of detuning has been reached.

\* \* \* \* \*